United States Patent
Rasal

(10) Patent No.: US 12,481,542 B2
(45) Date of Patent: Nov. 25, 2025

(54) OPTIMIZING RUNTIME CONFIGURATION OF PROCESSING UNITS USING MACHINE LEARNING

(71) Applicant: NVIDIA Corporation, Santa Clara, CA (US)

(72) Inventor: Shridhar Rasal, Pune (IN)

(73) Assignee: NVIDIA Corporation, Santa Clara, CA (US)

(*) Notice: Subject to any disclaimer, the term of this patent is extended or adjusted under 35 U.S.C. 154(b) by 0 days.

(21) Appl. No.: 18/216,205

(22) Filed: Jun. 29, 2023

(65) Prior Publication Data

US 2025/0004862 A1   Jan. 2, 2025

(51) Int. Cl.
*G06F 9/50* (2006.01)
*G06F 1/324* (2019.01)

(52) U.S. Cl.
CPC ............ *G06F 9/5094* (2013.01); *G06F 1/324* (2013.01); *G06F 9/505* (2013.01); *G06F 2209/501* (2013.01); *G06F 2209/5019* (2013.01); *G06F 2209/5022* (2013.01)

(58) Field of Classification Search
CPC ........ G06F 9/5094; G06F 1/324; G06F 9/505; G06F 2209/501; G06F 2209/5019; G06F 2209/5022
See application file for complete search history.

(56) References Cited

U.S. PATENT DOCUMENTS

| | | | |
|---|---|---|---|
| 2017/0031416 A1* | 2/2017 | Birke | G06F 1/324 |
| 2019/0188566 A1* | 6/2019 | Schuster | G06N 3/08 |
| 2019/0236458 A1* | 8/2019 | Taylor | G06F 17/17 |
| 2022/0179706 A1* | 6/2022 | Khosrowpour | G06F 11/3466 |
| 2023/0409401 A1* | 12/2023 | Hayasaka | G06F 11/3409 |
| 2024/0045699 A1* | 2/2024 | Tang | G06N 20/00 |

* cited by examiner

*Primary Examiner* — Jaweed A Abbaszadeh
(74) *Attorney, Agent, or Firm* — Lowenstein Sandler LLP

(57) ABSTRACT

Disclosed are apparatuses, systems, and techniques that use machine learning techniques for determination and tuning of runtime settings of processing units. In one embodiment, a computing device, which includes one or more processing units, processes, using a machine learning model, a runtime activity data to generate settings for the processing unit(s). The runtime activity data characterizes an execution of a computing application on the processing unit(s). The computing device then modifies, using the generated settings, the execution of the computing application on the processing unit(s).

19 Claims, 10 Drawing Sheets

OPTIMIZING RUNTIME CONFIGURATION OF PROCESSING UNITS USING MACHINE LEARNING

TECHNICAL FIELD

At least one embodiment pertains to processing resources and techniques that are used to improve efficiency and decrease power consumption during execution of computing applications. For example, at least one embodiment pertains to tuning of runtime settings of processing devices using machine learning models for power-performance optimization.

BACKGROUND

Modern computing devices often deploy multiple processing units, including central processing units (CPU), graphics processing units (GPU), and, in some instances, network-oriented data processing units (DPU). A CPU is a unit that often has multiple physical cores capable of performing complicated computations including serial computations. A GPU typically includes many more cores than a CPU and is capable of efficient execution of massively parallel computations. This makes GPUs the platforms of choice for applications amenable to parallel computations, including neural network applications and graphics applications where many multiplication and addition operations (e.g., matrix multiplications) are performed. For efficient implementation of such applications, modern GPUs are often implemented as system-on-chip (SoC) devices that deploy additional hardware circuits for efficient execution of various specialized tasks, including deep learning accelerators, multimedia complexes of video encoding/decoding engines, and so on. The video encoding/decoding engines are used to encode/decode video streams in various formats, including H.264, H.265, VP8, VP9, AV1, MPEG-2, and/or the like. Such multimedia complexes are deployed in automotive applications, infotainment systems, gaming applications, video and audio streaming applications, and/or the like.

DETAILED DESCRIPTION

Figure 1:
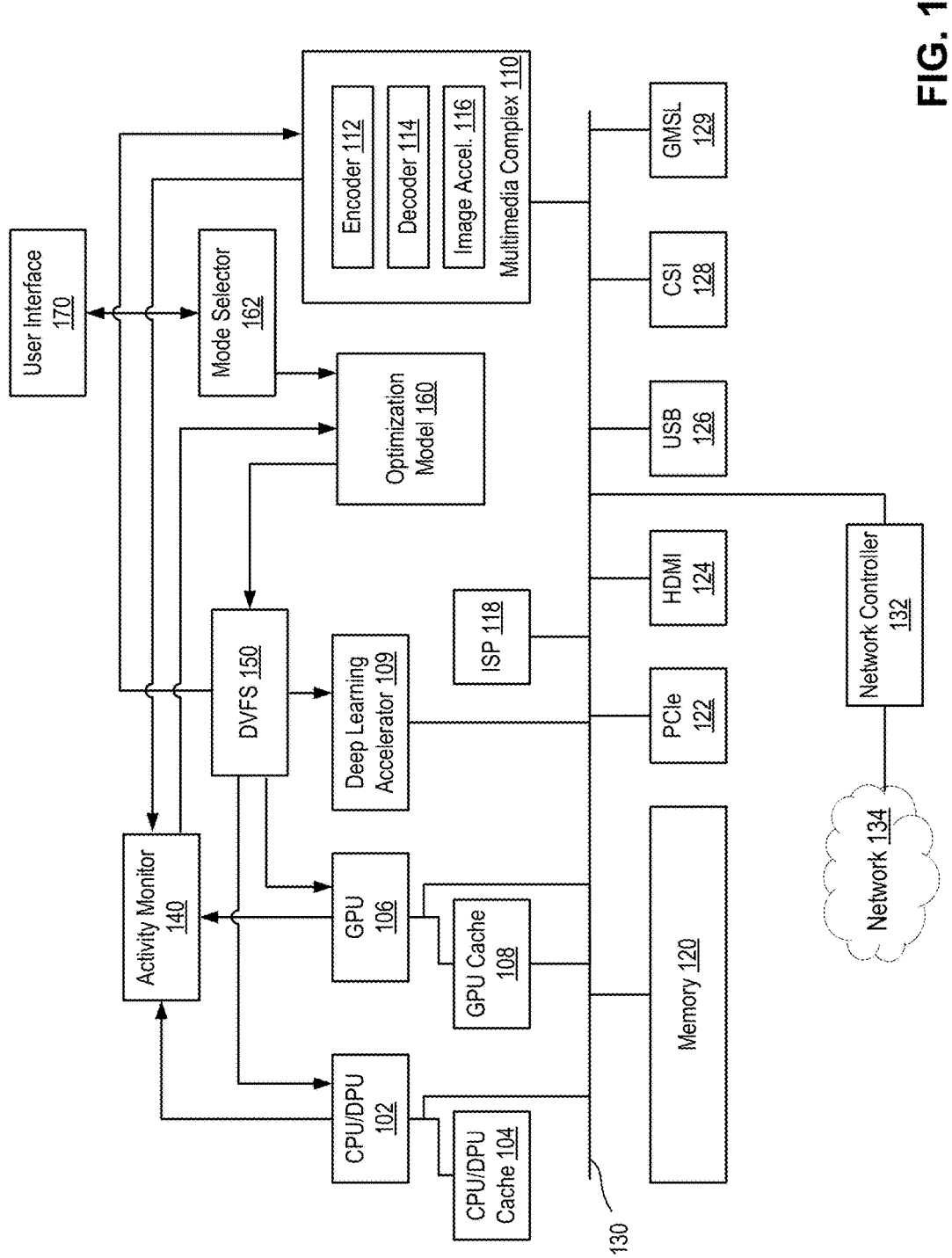
FIG. 1 is a block diagram of an example computing device capable of determining and tuning runtime settings of processing devices using machine learning for power-performance optimization, according to at least one embodiment.

The multimedia complexes and GPU-deploying SoCs often come with additional functions that allow monitoring runtime processing performance. For example, an activity monitor (also known as performance counter) may receive an activity signal from an engine executing a computing operation (e.g., the decode engine decoding a video stream). The activity signal may include a processing unit (PU) (e.g., GPU, CPU, DPU, an accelerator device, or any other processing unit or part thereof) utilization, e.g., as a percentage of the total number of flops supported by the PU at a current operating frequency. The activity signal may also reflect a current memory utilization metric, e.g., a percentage of the total memory that is being used to support the computing operation. The activity monitor may compare the PU (and/or memory) utilization metrics against set thresholds ("watermarks") and may take a remedial action whenever the GPU utilization exceeds a set (e.g., top) threshold $T_1$ (e.g., 90%, 80%, or the like). The activity monitor may trigger a software interrupt that causes an application software to use a Dynamic Voltage and Frequency Scaling (DVFS) unit to increase the PU operating frequency. Increasing the frequency enables the PU to process more flops per second and, therefore, reduce the PU utilization. Increasing the clock speed comes at a price of a higher power consumption by the PU. Conversely, the activity monitor may cause the DVFS unit to reduce the operating frequency when PU utilization falls below another (e.g., bottom) threshold $T_2$ (e.g., 30%, 40%, or the like) and thus to lower power consumption when high PU speed is not required. Although the activity monitor and the DVFS unit cooperate to improve power-performance balance during execution of computing applications, such cooperation is reactive and can come at the cost of DVFS (interrupt-caused) latency. Furthermore, the described power-performance management may not support learned behaviors. In particular, settings and policies learned during execution of one operation may not be used to optimize settings of other applications.

Aspects and embodiments of the instant disclosure address these and other technological challenges by disclosing methods and systems that use machine learning techniques to significantly improve efficiency and reduce latency of power-performance management in processing devices. In one example embodiment, an optimization model may be trained to proactively change settings of a PU based on a current state of the system, which may include activity data collected by an activity monitor. In some embodiments, the optimization model may be trained using machine learning techniques (e.g., reinforcement learning). More specifically, during training of the optimization model, a suitable computing application may be executed by a PU and the activity monitor may collect runtime activity data associated with utilization of the PU processing resources and/or the PU memory. The optimization model may use the activity data as an input. An additional input into the optimization model may include a type (e.g., standard) of bitstream (e.g., H.264 bitstream, H.265 bitstream, etc.), bit rate per frame of data, stutter metrics, jitter metrics, frame authentication routines (e.g., in the instances of streaming and/or safety-sensitive applications), and/or the like.

The total input into the optimization model may be referred to as the state $S_j$ of the processing device (the index j indicating that the state refers to timestamp $t_j$). The optimization model may process the input state $S_j$ and determine an action $A_j$ to be implemented and to change the current state of the processing device. In some embodiments, the output action $A_j$ may be communicated to and implemented by the DVFS unit. For example, the output action $A_j$ may include modification of the PU clock rate (e.g., operating frequency) settings. After the DVFS unit modifies the setting(s) of the PU, the runtime metrics of the PU may also change causing a corresponding change in the state of the processing device, $S_j \rightarrow S_{j+1}$ (at timestamp $t_{j+1}$). The activity monitor may detect the changes in the runtime activity and provide the updated state $S_{j+1}$ to both the optimization model and a training engine. The training engine may deploy a suitable reward function RF( ) to the new state to compute a reward value, $R_j$=RF ($S_{j+1}$). The reward value $R_j$ characterizes a benefit (or lack thereof) of action $A_j$ that has just been performed. The training engine may then change parameters of the optimization model to affect (and improve) the policy that is used by the optimization model in determining what action to take. The optimization model then uses the updated state of the processing device $S_{j+1}$ to determine a new action $A_{j+1}$ to be implemented by the DVFS unit. This training process may continue until the training engine causes the optimization model to learn a policy that maximizes the reward.

The reward function may include a plurality of weighted metrics that shape the learned policy by balancing performance metrics against power consumption. For example, performance metrics may include the number of flops per second, memory utilization, the number of dropped frames per second, and/or the like. Specific values of weights $\{W_i\}=W_1, W_2 \ldots$ for the metrics may be set during training and may indicate a degree to which performance is valued against power economy. In some embodiments, multiple sets of weights $\{W_i\}^{(1)}$, $\{W_i\}^{(2)}$, etc., may be defined during training resulting in the corresponding number of trained optimization models (also referred to as modes of the optimization model herein).

During the inference stage, the trained optimization model may be deployed in one of the learned modes, which may be selected based on the relative importance of performance and power economy for a particular application being executed. The trained and deployed optimization model then monitors (using the runtime activity data received via the activity monitor) the state of the processing device and generates an action that implements the learned policy. The advantages of the disclosed techniques include, but are not limited to, fast and efficient power and performance management of processing units that is tailored to specific requirements of various applications being deployed.

The systems and methods described herein may be used for a variety of purposes, by way of example and without limitation, for machine control, machine locomotion, machine driving, synthetic data generation, generative AI, model training, perception, augmented reality, virtual reality, mixed reality, robotics, security and surveillance, simulation and digital twinning, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems for generating or presenting at least one of augmented reality content, virtual reality content, mixed reality content, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implementing one or more language models, such as large language models (LLMs) (which may process text, voice, image, and/or other data types to generate outputs in one or more formats), systems implemented at least partially using cloud computing resources, and/or other types of systems.

System Architecture

FIG. 1 is a block diagram of an example computing device 100 capable of determining and tuning runtime settings of processing devices using machine learning for power-performance optimization, according to at least one embodiment. Computing device 100 may be (or implemented as part of) a desktop computer, a laptop computer, a smartphone, a tablet computer, a server, a data processing center, a computing device that accesses a remote server, a computing device that utilizes a virtualized computing environment, a gaming console, a wearable computer, a smart TV, and/or any combination thereof. Computing device 100 may deploy any number of PUs, which should be understood as including any physical or virtual devices capable of carrying out arithmetic and/or logic computations, including but not limited to CPUs/DPUs 102, GPUs 106, parallel processing units (PPUs), various task-specific accelerators/engines, and/or other suitable processing units capable of being tuned using the techniques disclosed herein. For example, computing device 100 may include a deep learning accelerator 109, which may be a high-performance parallel computation unit designed for efficient processing of artificial intelligence (AI) workloads, including (but not limited to) neural networks. Computing device 100 may further have a multimedia complex 110 that includes a video (or audio) encoder 112, such as NVENC, for fast encoding of video streams (e.g., codec compression) a video decoder 114, such as NVDEC, for fast decoding of video (or audio) streams (e.g., codec decompression), an image accelerator 116, such as nvJPEG, for high-speed processing decoding, encoding, and transcoding of digital images, and the like. In some embodiments, deep learning accelerator 109, encoder 112, decoder 114, image accelerator 116, and/or other PUs/accelerators/engines not specifically depicted in FIG. 1 may be implemented as one or more dedicated hardware circuits. In other embodiments, any or all of deep learning accelerator 109, encoder 112, decoder 114, image accelerator 116 may be implemented as software modules whose computations are supported by GPU 106 and/or CPU/DPU 102.

In some embodiments, computing device 100 may include an image signal processing unit 118 to perform various processing operations on images and/or video frames, including but not limited to noise filtering, demosaicing, artifact removal/reduction, edge enhancements, converting Bayer images to YUV formatted images, and/or the like.

Some PUs deployed by computing device 100, e.g., CPU/DPU 102 and/or GPU 106 may support any number of virtual PUs. For example, GPU 106 may include multiple cores, some or all cores being capable of executing multiple GPU threads. Some or all cores may run multiple threads concurrently (e.g., in parallel). In at least one embodiment, threads may have access to registers. Some or all cores may include a scheduler to distribute computing tasks and processes among different threads of the respective core. A dispatch unit may implement scheduled tasks on appropriate threads using various private registers and shared registers. In at least one embodiment, GPU 106 may have a (high-speed) cache 108, access to which may be shared by multiple cores. Furthermore, GPU 106 may include a GPU memory to store intermediate and/or final results (outputs) of various computations performed by GPU 106.

Computing device 100 may further include any number of memory devices, also referred to simply as memory 120 herein. Memory 120 may store executable codes, libraries, and various dependencies of one or more applications supported by computing device 100. Various PUs may have access to a high-speed cache, e.g., CPU/DPU cache 104, GPU cache 108, and the like. Memory 120 may be connected to various PUs of computing device 100 via a high-performance bus (interconnect) 130. Bus 130 may also support connectivity of various peripheral devices, e.g., cameras (e.g., video cameras) for capturing images (or sequences of images), microphones for capturing sounds, scanners, sensors, or any other devices for intake of data. Peripheral devices may be connected to bus 130 using a Peripheral Component Interconnect Express (PCIe) 122, a High-Definition Multimedia Interface (HDMI) 124 for transmitting compressed or uncompressed video and/or audio data, a Universal Serial Bus interface 126, a Camera Serial Interface (CSI) 128, a Gigabit Multimedia Serial Link (GMSL) 129, and/or the like.

Computing device 100 may also include a network controller 132 to facilitate connection to a network 134. Network 134 may be a public network (e.g., the Internet), a private network (e.g., a local area network (LAN), or wide area network (WAN)), a wireless network, a personal area network (PAN), a mesh network, and/or any combination thereof. In one example embodiment, network controller 132 may receive (or transmit) a stream of compressed video frames that are to be decoded by decoder 114 (or frames that have been previously encoded by encoder 112).

Computing device 100 may include one or more activity monitors 140. Activity monitor 140 may monitor runtime metrics reflective of performance of any PUs, such as CPU/DPU 102, GPU 106, deep learning accelerator 109, encoder 112, decoder 114, image accelerator 116, and/or any other PUs that may be deployed by computing device 100. Although, for brevity and conciseness, a single activity monitor 140 is depicted in FIG. 1, activities and runtime metrics of different PUs of computing device 100 may be monitored by more than one activity monitor, e.g., by separate activity monitors 140. Activity monitor 140 may include a combination of hardware circuits and/or software (firmware) modules that collect various metrics of PU activities, process the collected metrics, and take one or more actions based on the collected and/or processed metrics. For example, activity monitor 140 may collect an instantaneous processing load (e.g., a number of flops executed per unit of time) of a respective PU being monitored, a current memory utilization (e.g., a fraction of GPU cache 108 being used), and/or the like. Activity monitor 140 may process the collected data, e.g., average the instantaneous processing load and/or current memory utilization over a suitable sliding window (e.g., using an infinite impulse response (IIR) filter or some other mechanism), obtain various statistics characterizing the collected data (e.g., a mean and a variance of the processing load over the sliding window), and/or the like. In some embodiments, activity monitor 140 may include a processing logic (e.g., a finite state machine) configurable to respond to the collected metrics (or statistics thereof) meeting certain thresholds (watermarks). For example, activity monitor 140 may be configured to generate an interrupt if processing load P deviates from a target range, $T_2 \leq P \leq T_1$.

Computing device 100 may further include a DVFS unit 150 to control operating frequency and/or voltage of a particular PU. Although, for brevity and conciseness, a single DVFS unit 150 is depicted in FIG. 1, operating frequency/voltage of different PUs of computing device 100 may be controlled by separate DVFS units 150. Frequency settings may determine the rate at which a respective PU performs computations. Voltage settings (as applied to transistors of the PU) determine how quickly transistors of the PU respond to control signals. Higher operating frequency is typically supported by higher voltages. In some embodiments, available frequency and voltage settings may come in discrete sets of values, e.g., frequency-voltage pairs. In some embodiments, one of the settings (e.g., frequency) may be controlled by an application software whereas the other settings (e.g., voltage) is then selected by DVFS 150 (e.g., using matching frequency-voltage pairs).

Frequency-voltage settings may be controlled by an optimization model 160, which may operate as disclosed in conjunction with FIG. 2 below. Optimization model 160 may receive runtime activity data generated by activity monitor 140 during execution of any suitable computing application by one or more PUs. Various additional inputs, which may include, for example and without limitation: metadata associated with the execution (e.g., characterizing a type of data being processed) and various metrics collected by application software (e.g., frequency of frame stutter, pixel jitters, type of frame authentication), may also be processed by optimization model 160. Optimization model 160 may be trained to output settings for PUS, which are to be implemented by DVFS 150 or similar circuits. Operations of optimization model 160 may be controlled by a mode selector 162, which may select one of the modes of operations learned by optimization model 160 during training. Different modes may balance PU(s) performance against the power consumed by the PU(s). For example, one mode may be used with high-priority applications and may prioritize performance over power economy. Another mode may be used with low priority applications and may prioritize power economy over speed or accuracy of execution. Yet another mode may be a compromise mode where mid-range performance is balanced with moderate power consumption.

In some embodiments, computing device 100 may support a user interface 170 that informs a user/operator of computing device 100 about an optimization mode selected by mode selector 162 to support one or more computing applications for the user/operator. In some embodiments, the user/operator may utilize user interface 170 to select or change the mode to be used by optimization model 160. In some embodiments, user interface 170 may be located on a remote computing device communicating with computing device 100 over network 134. For example, computing device 100 may be a cloud-based server and the remote computing device may be a user's computer.

Figure 2:
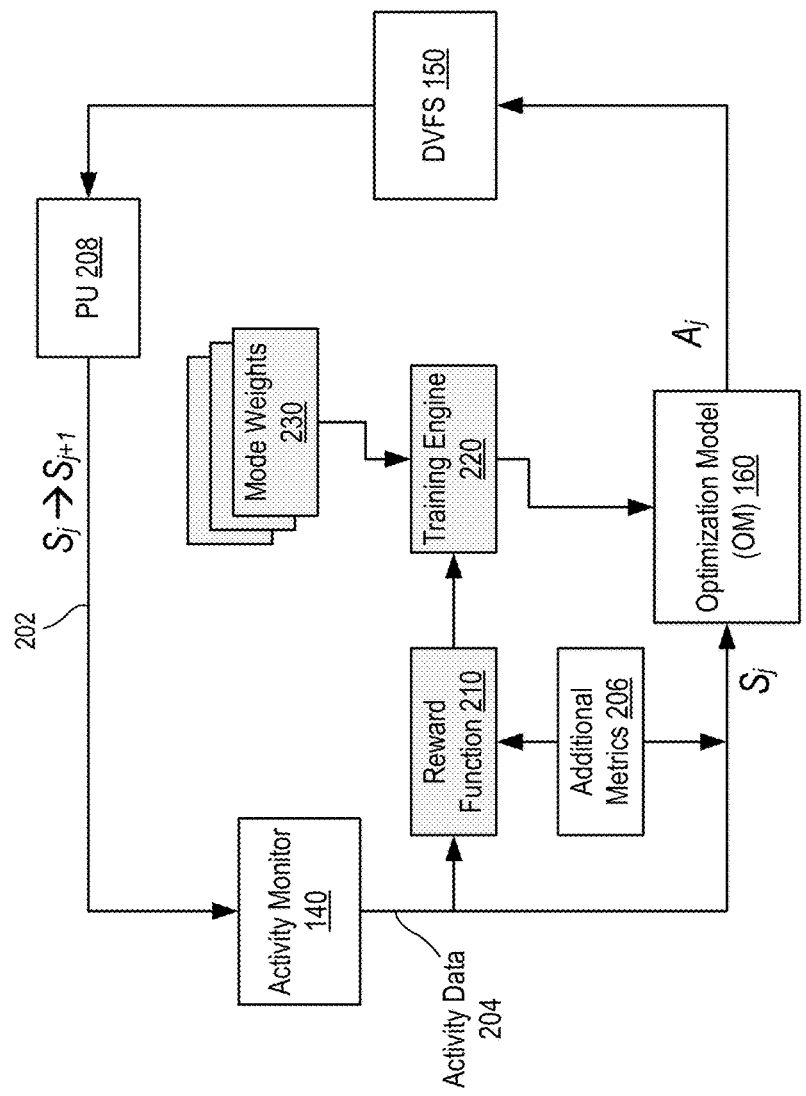
FIG. 2 is a block diagram illustrating operations of an optimization model of the example computing device of FIG. 1 capable of determining and tuning runtime settings of processing units, according to at least one embodiment.

FIG. 2 is a block diagram illustrating operations 200 of an optimization model 160 of an example computing device 100 capable of determining and tuning runtime settings of processing units, according to at least one embodiment. FIG. 2 illustrates both the operations performed during a training stage of optimization model 160 and the operations performed during inference stage that deploys trained optimization model 160, with shaded blocks indicating function that may be inactive during inference.

In some embodiments, optimization model 160 may be or include one or more deep neural networks having one or more hidden layers, e.g., convolutional neural networks (CNNs), recurrent neural networks (RNN), fully-connected neural networks, transformer neural networks, and/or any other networks or a combination thereof. Various neurons of optimization model 160 may receive inputs from other neurons or from an external source and may produce an output by computing a sum of weighted inputs and a bias value (and, optionally, subject to an activation function). In one illustrative example, weights and biases may initially be assigned random values that are modified during training of optimization model 160. Optimization model 160 may be trained using various learning techniques, including reinforcement learning, supervised learning, or unsupervised learning.

As illustrated in FIG. 2, activity monitor 140 may receive signal 202 from a PU 208, the signal being representative of runtime activity of PU 208. PU 208 may include any of processing units illustrated in FIG. 1, e.g., CPUs, DPUs, GPUs, PPUs, task-specific accelerators or engines, and/or the like, or any combination thereof. In some embodiments, PU 208 may include multiple processing units, e.g., a CPU and a GPU that are used for joint execution of a computing application. Signal 202 may be or include any digital or analog signal representative of a current processing load of PU 208, a current memory utilization by PU 208, and/or the like. In some embodiments, e.g., where PU 208 includes multiple units connected via a network (or a network-based memory device), signal 202 may be further representative of network latency and/or throughput. In some embodiments, signal 202 may be representative of various additional metrics. Activity monitor 140 may convert signal 202 into activity data 204. Activity data 204 may include information carried by signal 202 (which may be converted into a format that conforms with an input format for optimization model 160) as well as various additional information. For example, activity data 204 may include an average of the processing load P(t) over a suitable sliding window $t_s$ (e.g., one or several seconds), average current memory utilization over $t_s$, variance of the processing load/memory utilization over $t_s$, and/or the like. In some embodiments, activity monitor 140 may monitor a set of thresholds $T_1$, $T_2$, etc., and include, in activity data 204, a number of times that various thresholds have been crossed (e.g., by a time-dependent processing load P(t), memory utilization, or by some other metric) during the sliding window $t_s$. Activity monitor 140 may prepare a new set of input data for each of a set of (e.g., equally-spaced) times $t_j$.

Figure 3:
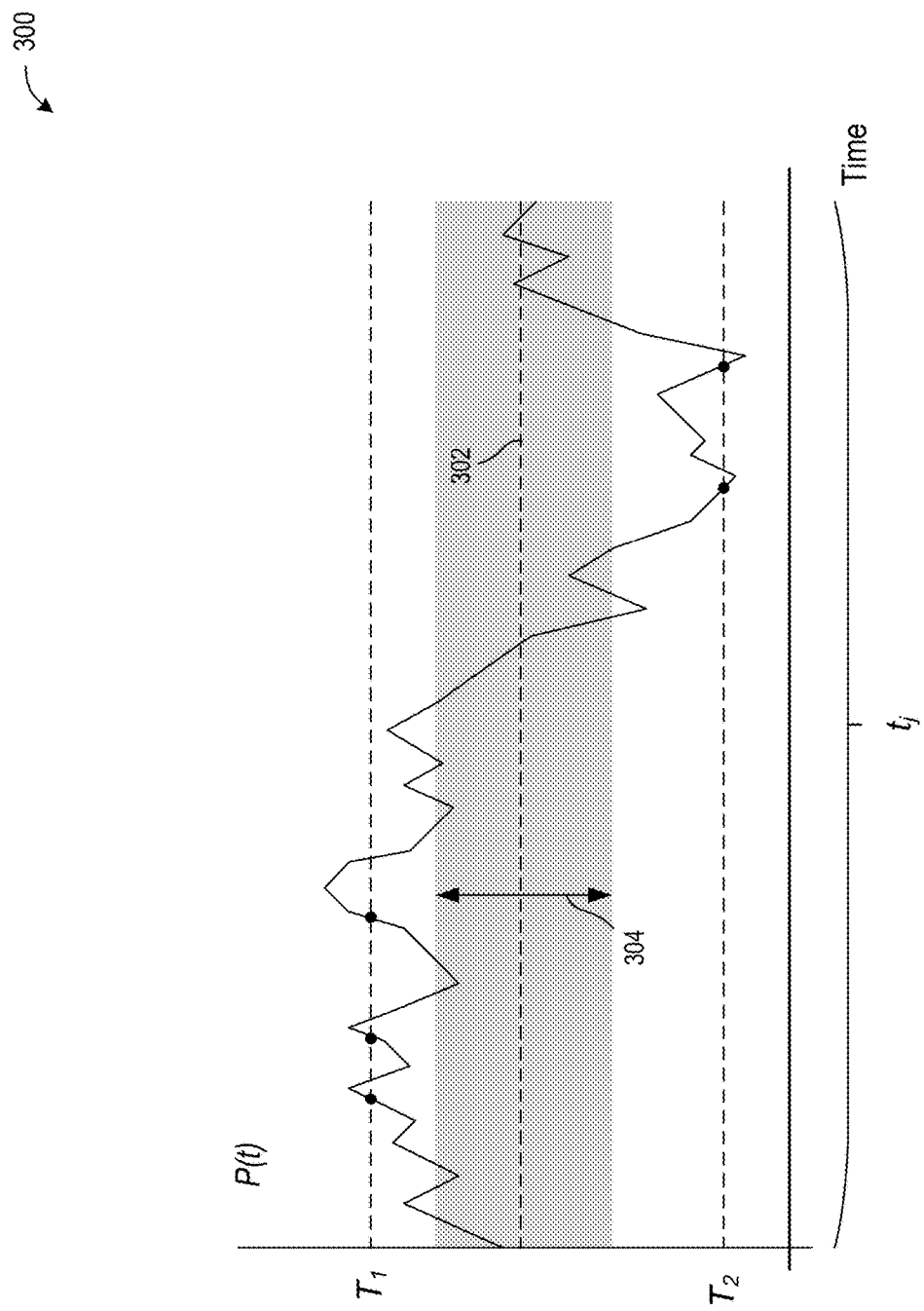
FIG. 3 illustrates schematically example runtime metrics that may be tracked by an activity monitor and used as an input into the optimization model illustrated in FIG. 2, according to at least one embodiment.

FIG. 3 illustrates schematically example runtime metrics 300 that may be tracked by activity monitor 140 and used as an input into optimization model 160, according to at least one embodiment. As illustrated in FIG. 3, a processing load P(t) is measured as a function of time t and evaluated over a sliding window associated with timestamp $t_j$ (which may correspond to the end of the sliding window of duration $t_s$). Activity monitor 140 may track an average processing load 302 and the standard deviation 304 of the processing load from the average value. Additionally, activity monitor 140 may track a number of times (three, in this example) that processing load P(t) exceeded a top threshold $T_1$ of the target interval of processing loads and a number of times (two, in this example) that processing load P(t) fell below a bottom threshold $T_2$ of the target interval.

Referring again to FIG. 2, an input into optimization model 160 may further include additional metrics 206, which may include any data obtained from one or more sources different from PU 208, e.g., metrics tracked by an application software whose instructions are being executed by PU 208. Such additional metrics may provide, for optimization model 160, an overall context of the application execution. In one non-limiting example of video decoding, additional metrics 206 may include a frequency of frame stutter (e.g., a frequency of instances where PU 208 has failed to decode a frame in time for its display so that a previous frame continued to be displayed), amount of pixel jitter (non-uniformity of time that different pixels are being displayed on a screen), type of frame authentication (e.g., an indication of an algorithm of digital signature authentication) in the instances of processing safety-sensitive data (e.g., video generated by a vehicle camera) or proprietary data (e.g., video streaming and/or gaming data).

Input into optimization model 160 represents a state Si of the computing device (to be understood as a joint state of PU 208 and the computing application executed thereon) at timestamp $t_j$. Optimization model 160 may process the input state $S_j$ and output an action $A_j$ to be implemented. In some embodiments, action $A_j$ may be selected from a list of predefined actions. For example, the action $A_j$ may include selection of the PU operating frequency from a list of predefined frequencies (e.g., as enabled by specification of PU 208). Output action $A_j$ may be communicated to DVFS unit 150, which implements the output action. In some instances, implementation of action $A_j$ by DVFS unit 150 may result in a change of the state of the computing device (e.g., by changing the operating frequency as ordered by optimization model 160) at the next timestamp $t_{j+1}$, e.g., $S_j \to S_{j+1}$. Activity monitor 140 may detect the changes in the runtime activity of PU 208 and provide the updated state $S_{j+1}$ to optimization model 160.

Additionally, a copy of the updated state $S_{j+1}$ may be provided to a training engine 220 for evaluation of the benefit of the performed action $A_j$. To carry out such an evaluation, training engine 220 may apply a suitable reward function 210 to the new state to compute a reward value, $R_j$=RF $(S_{j+1})$. The reward value $R_j$ characterizes a benefit (or lack thereof) of the performed action $A_j$. Based on the reward value $R_j$ (e.g., with higher reward values indicating more beneficial actions and lower reward value indicating less beneficial actions), training engine 220 may change parameters of optimization model 160, e.g., using techniques of backpropagation, gradient descent, and/or the like. The modification of parameters causes optimization model 160 to develop a policy for decision-making that maximizes the reward value for a variety of input states. Optimization model 160 (with modified parameters) may then use the updated state of the processing device $S_{j+1}$ to determine a new action $A_{j+1}$ to be implemented by DVFS unit 150. This training process may continue until a target performance of optimization model 160 is achieved, e.g., a reward value R being above a certain value for a predetermined percentage of actions taken.

Reward function RF( ) 210 may include a plurality of weighted metrics that shape the learned policy by balancing performance metrics against power consumption, e.g., $$R = -W_1 \cdot \text{Power} + W_2 \cdot \text{Perf}_1 + W_3 \cdot \text{Perf}_2 + \ldots ,$$

Where Power is a power consumption metric (e.g., computed using a measured rail voltage for PU 208), and $\text{Perf}_1$, $\text{Perf}_2$ ... is a set of performance metrics (e.g., application-specific performance metrics) that may include a number of flops per second, memory utilization, a number of dropped frames per second, latency in displaying frames, and/or the like. A set of weights $\{W_i\}=W_1$, $W_2$ ... for power-performance metrics may be defined during training, and may indicate a degree to which performance is valued against power economy. In some embodiments, multiple sets of mode weights 230 may be defined, e.g., $\{W_i\}^{(1)}$, $\{W_i\}^{(2)}$, etc., with each set of mode weights used during training to train a respective mode of optimization model 160. (Each mode of optimization model 160 is typically characterized by a different set of neural network parameters and, therefore, may be viewed as a separate optimization model 160).

Figure 4:
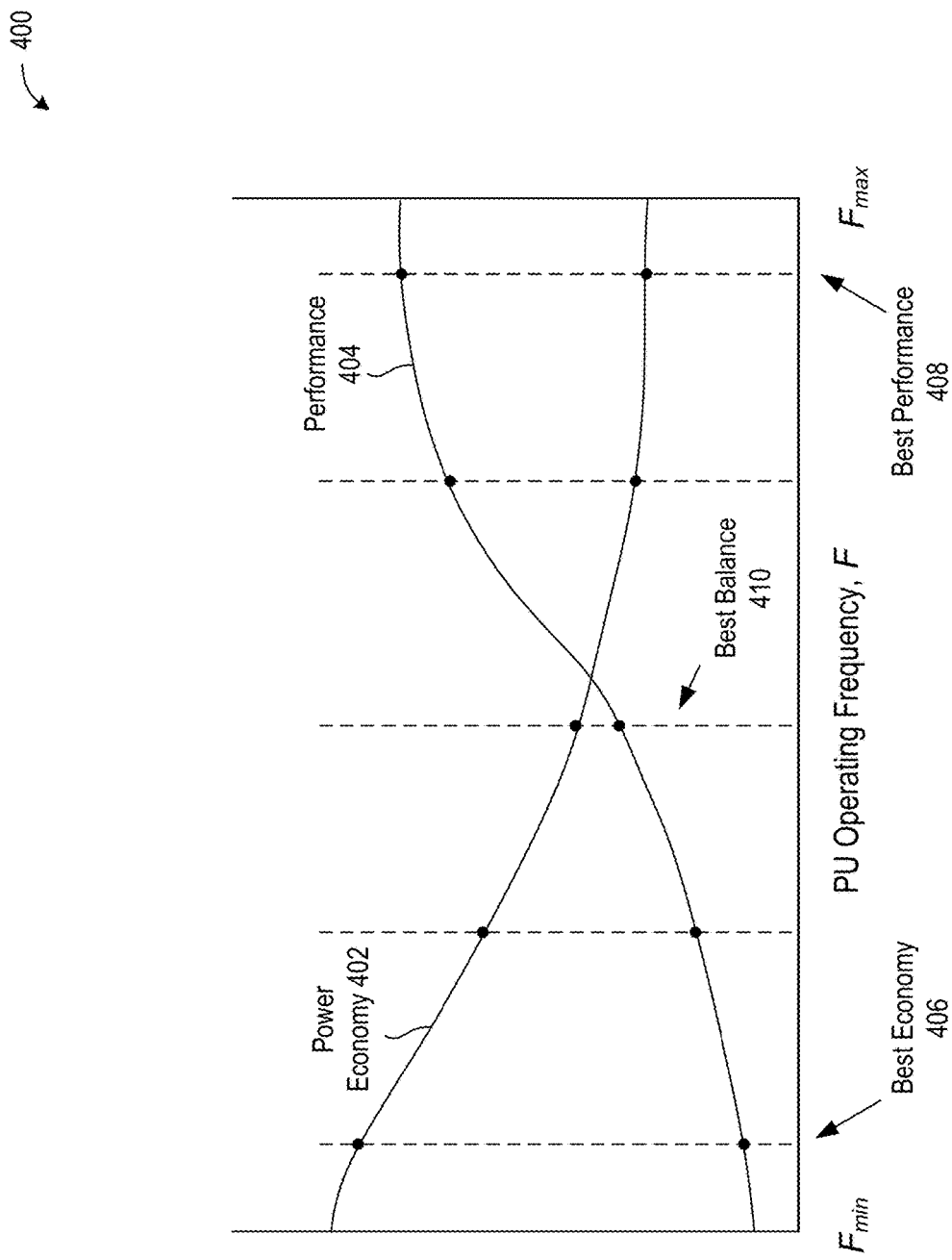
FIG. 4 illustrates schematically a mode selection performed as part of training of the optimization model, according to at least one embodiment.

FIG. 4 illustrates schematically mode selection 400 performed as part of training of optimization model 160, according to at least one embodiment. Power economy curve 402 illustrates schematically dependence of power economy (e.g., an inverse of power consumption or other similar metric) as a function of an operating frequency F within available range $[F_{min}, F_{max}]$ of PU-supported frequencies. Performance curve 404 indicates schematically a suitable performance metric (e.g., a number of flops per one second) as a function of the operating frequency. Multiple performance curves may be used in the instances where several performance metrics are defined. Black dots and vertical dashed lines indicate those PU configurations that differ by power-performance balance, including best economy mode 406, best performance mode 408, and best balance mode 410.

In some embodiments, multiple optimization models 160 may be trained for different types of applications, using application-specific training data. For example, one model may be trained for video streaming applications, another model may be trained for image processing applications, yet another model may be trained for deep learning applications. During the inference stage, the trained optimization model 160 may be deployed in one of the learned modes, which may be selected based on the relative importance of performance and power economy for a particular application being executed. The trained and deployed optimization model 160 monitors (e.g., using runtime activity data received via activity monitor 140, as done during training) a state of the processing device and generates an action that implements the learned policy.

Figure 5:
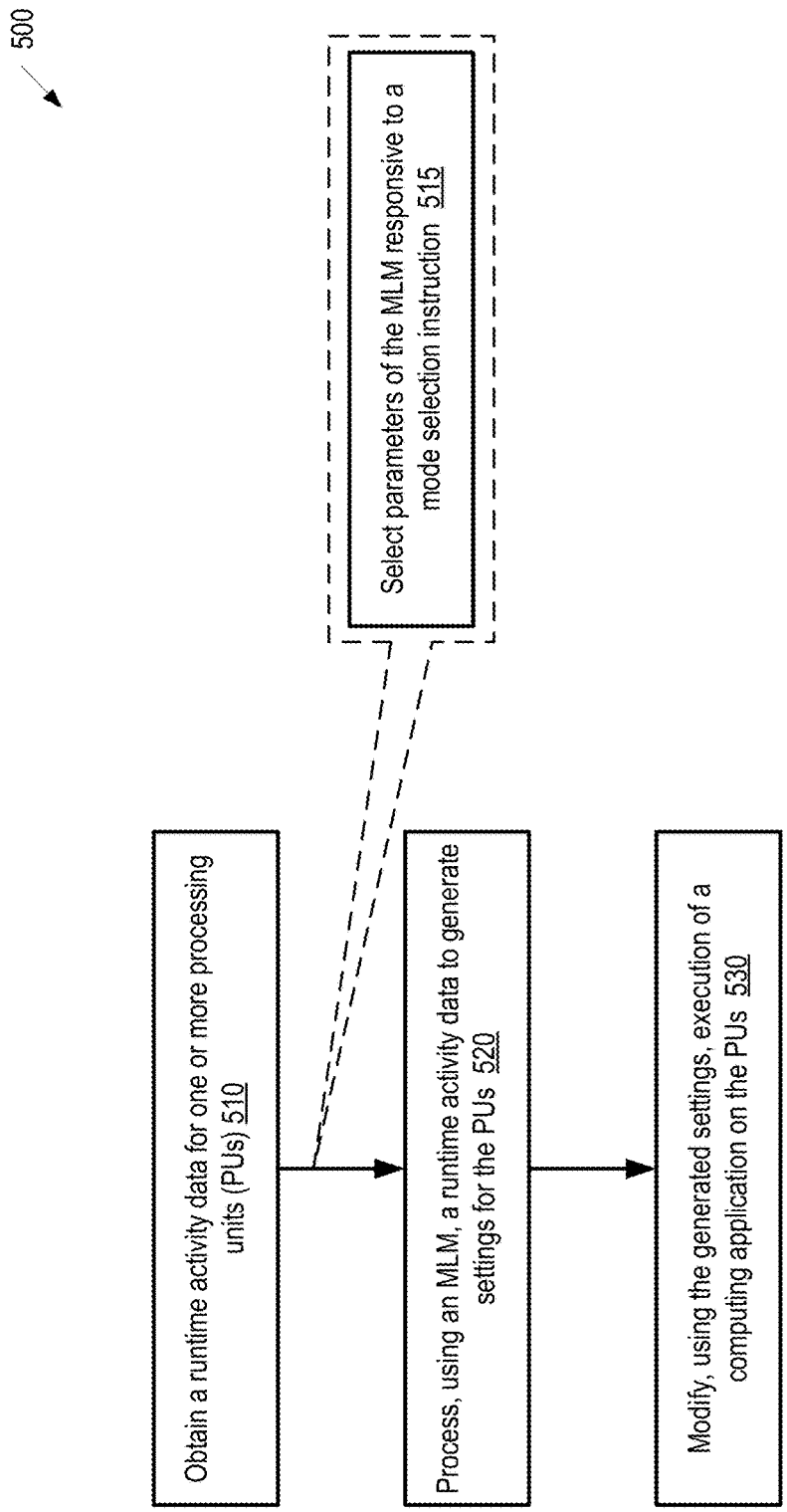
FIG. 5 is a flow diagram of an example method of performing an inference stage of machine learning-based determination and tuning of runtime settings of processing units, according to at least one embodiment.
Figure 6:
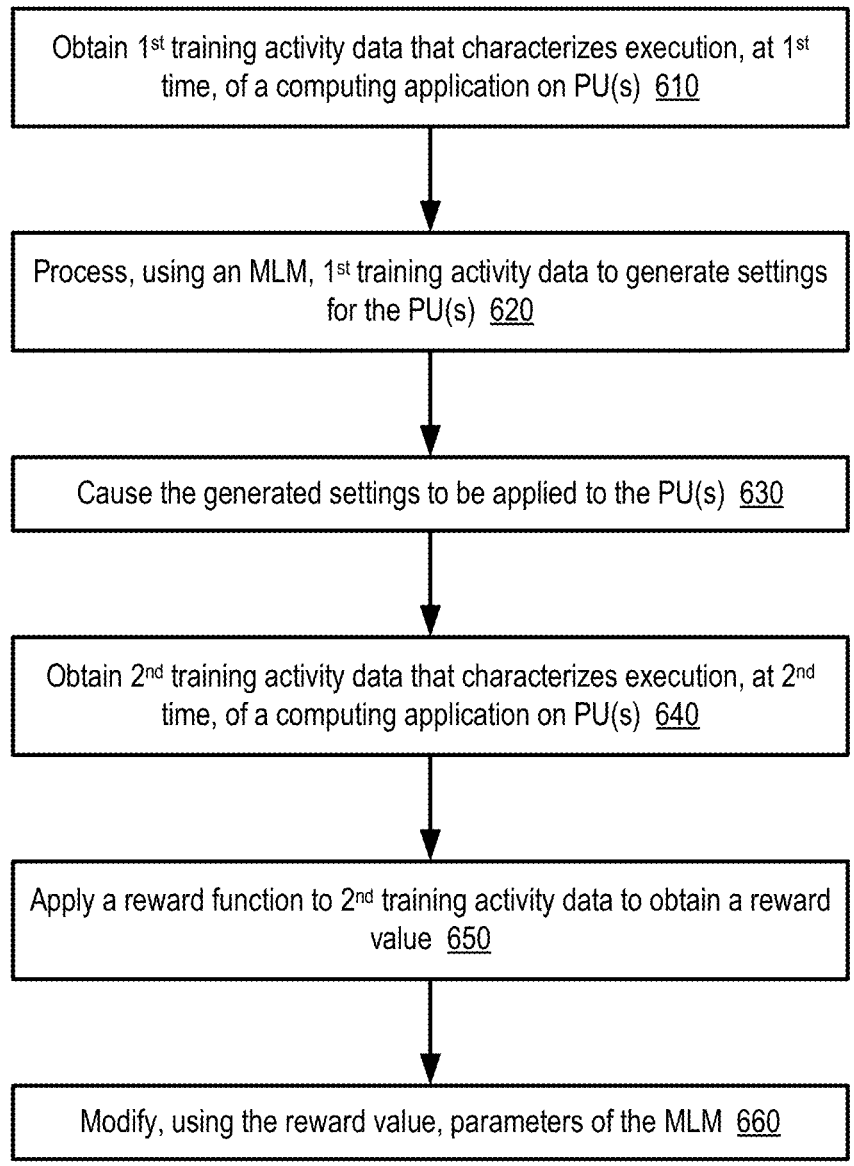
FIG. 6 is a flow diagram of an example method of performing a training stage of training machine learning models for determination and tuning of runtime settings of processing units, according to at least one embodiment.

FIGS. 5 and 6 are flow diagrams of example methods 500 and 600 of using machine learning for determining and tuning runtime settings of processing units, according to some embodiments of the present disclosure. Methods 500 and 600 may be performed in the context of autonomous driving applications, industrial control applications, provisioning of streaming services, video monitoring services, computer-vision based services, artificial intelligence and machine learning services, mapping services, gaming services, virtual/mixed reality or augmented reality services, conversational AI, generative AI, and many other contexts, and/or in systems and applications for providing one or more of the aforementioned services. Methods 500 and 600 may be performed using one or more processing units (e.g., CPUs, GPUs, accelerators, PPUs, DPUs, etc.), which may include (or communicate with) one or more memory devices.

In at least one embodiment, methods 500 and 600 may be performed using a computing device 100 of FIG. 1. In at least one embodiment, processing units performing any of methods 500 and 600 may be executing instructions stored on a non-transient computer-readable storage media. In at least one embodiment, any of methods 500 and 600 may be performed using multiple processing threads (e.g., CPU threads and/or GPU threads), individual threads executing one or more individual functions, routines, subroutines, or operations of the method. In at least one embodiment, processing threads implementing any of methods 500 and 600 may be synchronized (e.g., using semaphores, critical sections, and/or other thread synchronization mechanisms). Alternatively, processing threads implementing any of methods 500 and 600 may be executed asynchronously with respect to each other. Various operations of any of methods 500 and 600 may be performed in a different order compared with the order shown in FIGS. 5 and 6. Some operations of any of methods 500 and 600 may be performed concurrently with other operations. In at least one embodiment, one or more operations shown in FIGS. 5 and 6 may not always be performed.

FIG. 5 is a flow diagram of an example method 500 of performing an inference stage of machine learning-based determination and tuning of runtime settings of processing units, according to at least one embodiment. Method 500 may be performed to optimize settings of processing units that include one or more GPUs (e.g., NVIDIA Geforce® or similar), one or more CPUs, one or more DPUs (e.g., NVIDIA Bluefield® or similar), one or more hardware accelerators (e.g., NVENC, NVDEC, or similar accelerators), and/or the like. In some embodiments, method 500 may be performed to optimize settings of processing units implemented on a SoC (e.g., NVIDIA Tegra®). In some embodiments, method 500 may be performed to facilitate efficient execution of any suitable computing application, including but not limited to a video or audio encoding application, a video or audio decoding application, an image processing application, a machine learning application, and/or the like. Method 500 may be implemented using an MLM (e.g., optimization model 160) that is trained using one or more reinforcement learning techniques (e.g., techniques illustrated in conjunction with FIG. 6). The MLM may be executed using the same processing units whose operations are being optimized or by other processing devices.

At block 510, method 500 may include obtaining a runtime activity that characterizes an execution of a computing application on the one or more processing units. In some embodiments, the runtime activity data may include a runtime processing load of the one or more processing units and/or a runtime memory utilization by the one or more processing units. For example, the runtime processing load may include some or all of the following: an average runtime processing load over a sliding window, a standard deviation of the runtime processing load from the runtime processing load, a statistics of the runtime processing load departures from a target range of processing loads, and/or the like.

At block 520, method 500 may include processing, using the MLM, the runtime activity data to generate settings for the one or more processing units. In some embodiments, the generated settings may include an operating frequency of at least one of the one or more processing units.

At block 530, method 500 may include modifying, using the generated settings, the execution of the computing application on the one or more processing units. For example, such modification may include modifying an operating frequency of the one or more processing units.

As illustrated with the callout portion of FIG. 5, in some embodiments, method 500 may include, at block 515, selecting parameters of the MLM responsive to a mode selection instruction. The mode selection instruction may select a mode of the MLM from a plurality of modes associated with different target power-performance metrics for the one or more processing units (e.g., as disclosed in conjunction with FIG. 3).

FIG. 6 is a flow diagram of an example method 600 of performing a training stage of training machine learning models for determination and tuning of runtime settings of processing units, according to at least one embodiment. At block 610, method 600 may include obtaining first training activity data that characterizes execution, at a first (second, third, etc.) time, of a computing application using one or more processing units. At block 620, method 600 may include processing, using an MLM being trained, the first (second, third, etc.) training activity data to generate settings for the one or more processing units. At block 630, method 600 may continue with causing the generated settings to be applied to the one or more processing units. At block 640, method 600 may include obtaining a second (third, fourth, etc.) training activity data that characterizes execution, at a second (third, fourth, etc.) time, of the computing application on the one or more processing units. At block 650, method 600 may include applying a reward function to the second (third, fourth, etc.) training activity data to obtain a reward value. A block 660, method 600 may continue with modifying, using the reward value, one or more parameters of the MLM. Blocks 610-660 of method 600 may be repeated multiple times, e.g., until a target performance of the MLM is achieved.

In some embodiments, the reward function used at block 650 may include a plurality of weighted metrics. Individual metrics of the plurality of weighted metrics may be associated with some or all of the following: one or more performance metrics characterizing performance of the one or more processing units during execution of the computing application, or one or more a power economy metric characterizing power consumption by the one or more processing units during execution of the computing application.

Inference and Training Logic

Figure 7A:
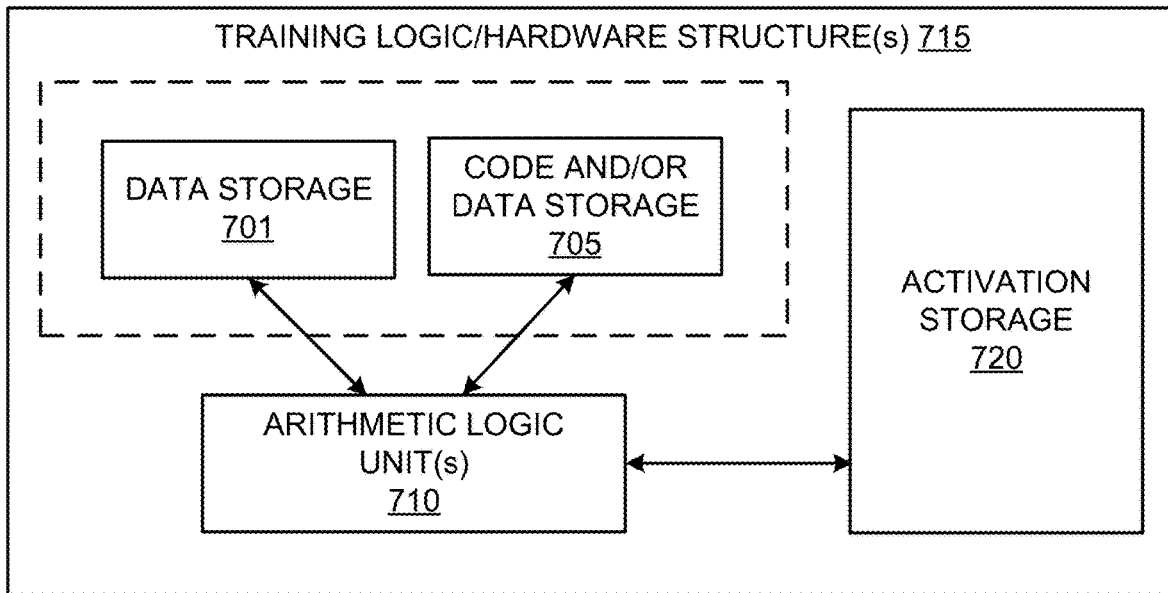
FIG. 7A illustrates inference and/or training logic, according to at least one embodiment.

FIG. 7A illustrates inference and/or training logic 715 used to perform inferencing and/or training operations associated with one or more embodiments.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs) or simply circuits). In at least one embodiment, code, such as graph code, loads weight or other parameter information into processor ALUs based on an architecture of a neural network to which such code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 701 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs).

In at least one embodiment, code, such as graph code, causes the loading of weight or other parameter information into processor ALUs based on an architecture of a neural network to which such code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to one or more processors or other hardware logic devices or circuits. In at least one embodiment, code and/or data storage 705 may be cache memory, DRAM, SRAM, non-volatile memory (e.g., flash memory), or other storage. In at least one embodiment, a choice of whether code and/or data storage 705 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be a combined storage structure. In at least one embodiment, code and/or data storage 701 and code and/or data storage 705 may be partially combined and partially separate. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., flash memory), or other storage. In at least one embodiment, activation storage 720 may be completely or partially within or external to one or more processors or other logical circuits. In at least one embodiment, a choice of whether activation storage 720 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 illustrated in FIG. 7A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
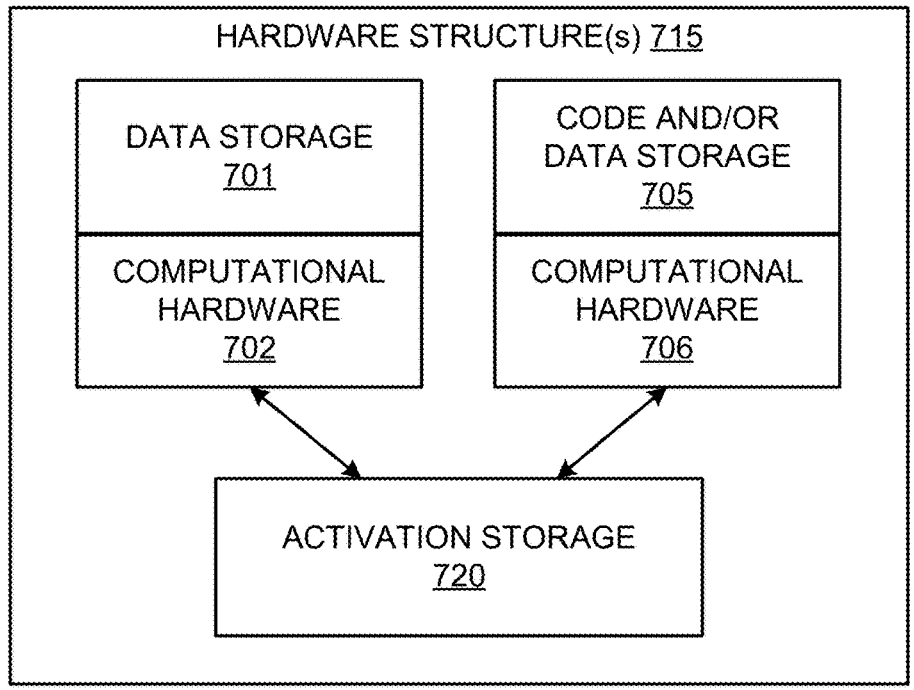
FIG. 7B illustrates inference and/or training logic, according to at least one embodiment.

FIG. 7B illustrates inference and/or training logic 715, according to at least one embodiment. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one storage/computational pair 701/702 of code and/or data storage 701 and computational hardware 702 is provided as an input to a next storage/computational pair 705/706 of code and/or data storage 705 and computational hardware 706, in order to mirror a conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage/computation pairs 701/702 and 705/706 may be included in inference and/or training logic 715.

Neural Network Training and Deployment

Figure 8:
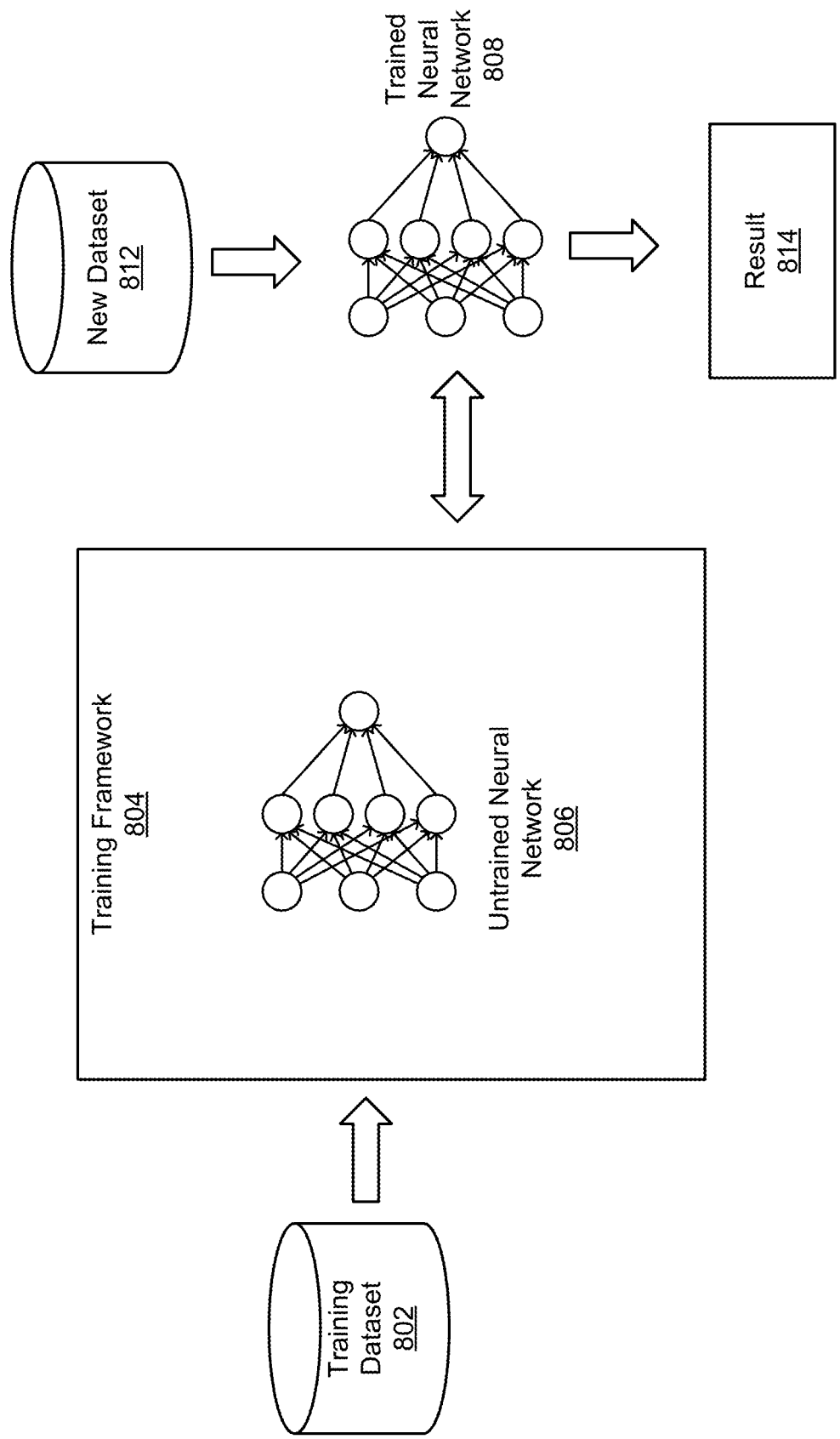
FIG. 8 illustrates training and deployment of a neural network, according to at least one embodiment.

FIG. 8 illustrates training and deployment of a deep neural network, according to at least one embodiment. In at least one embodiment, untrained neural network 806 is trained using a training dataset 802. In at least one embodiment, training framework 804 is a PyTorch framework, whereas in other embodiments, training framework 804 is a TensorFlow, Boost, Caffe, Microsoft Cognitive Toolkit/CNTK, MXNet, Chainer, Keras, Deeplearning4j, or other training framework. In at least one embodiment, training framework 804 trains an untrained neural network 806 and enables it to be trained using processing resources described herein to generate a trained neural network 808. In at least one embodiment, weights may be chosen randomly or by pretraining using a deep belief network. In at least one embodiment, training may be performed in either a supervised, partially supervised, or unsupervised manner.

In at least one embodiment, untrained neural network 806 is trained using supervised learning, wherein training dataset 802 includes an input paired with a desired output for an input, or where training dataset 802 includes input having a known output and an output of neural network 806 is manually graded. In at least one embodiment, untrained neural network 806 is trained in a supervised manner and processes inputs from training dataset 802 and compares resulting outputs against a set of expected or desired outputs. In at least one embodiment, errors are then propagated back through untrained neural network 806. In at least one embodiment, training framework 804 adjusts weights that control untrained neural network 806. In at least one embodiment, training framework 804 includes tools to monitor how well untrained neural network 806 is converging towards a model, such as trained neural network 808, suitable to generating correct answers, such as in result 814, based on input data such as a new dataset 812. In at least one embodiment, training framework 804 trains untrained neural network 806 repeatedly while adjusting weights to refine an output of untrained neural network 806 using a loss function and adjustment algorithm, such as stochastic gradient descent. In at least one embodiment, training framework 804 trains untrained neural network 806 until untrained neural network 806 achieves a desired accuracy. In at least one embodiment, trained neural network 808 can then be deployed to implement any number of machine learning operations.

In at least one embodiment, untrained neural network 806 is trained using unsupervised learning, whereas untrained neural network 806 attempts to train itself using unlabeled data. In at least one embodiment, unsupervised learning training dataset 802 will include input data without any associated output data or "ground truth" data. In at least one embodiment, untrained neural network 806 can learn groupings within training dataset 802 and can determine how individual inputs are related to untrained dataset 802. In at least one embodiment, unsupervised training can be used to generate a self-organizing map in trained neural network 808 capable of performing operations useful in reducing dimensionality of new dataset 812. In at least one embodiment, unsupervised training can also be used to perform anomaly detection, which allows identification of data points in new dataset 812 that deviate from normal patterns of new dataset 812.

In at least one embodiment, semi-supervised learning may be used, which is a technique in which in training dataset 802 includes a mix of labeled and unlabeled data. In at least one embodiment, training framework 804 may be used to perform incremental learning, such as through transferred learning techniques. In at least one embodiment, incremental learning enables trained neural network 808 to adapt to new dataset 812 without forgetting knowledge instilled within trained neural network 808 during initial training.

Figure 9:
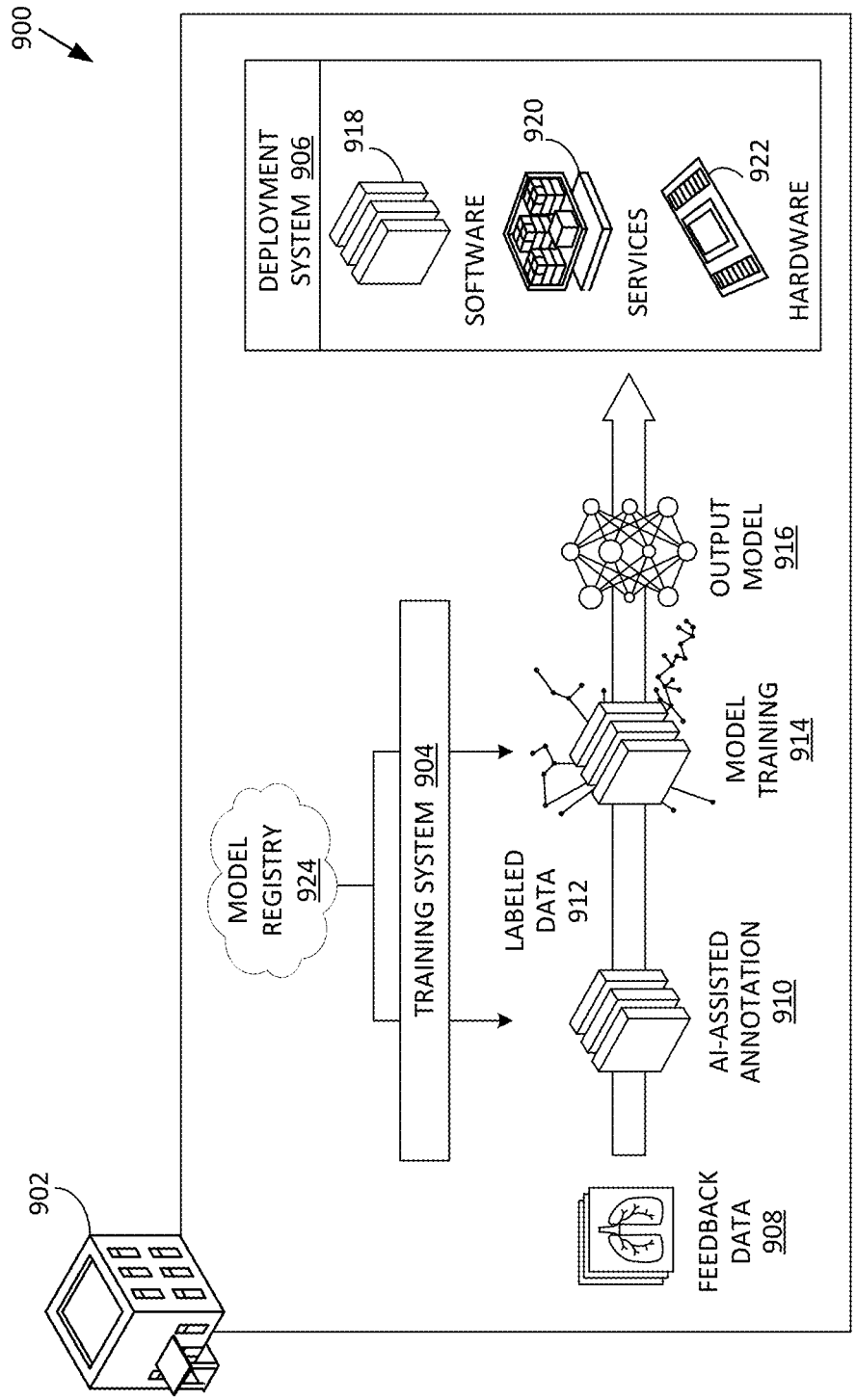
FIG. 9 is an example data flow diagram for an advanced computing pipeline, according to at least one embodiment.

With reference to FIG. 9, FIG. 9 is an example data flow diagram for a process 900 of generating and deploying a processing and inferencing pipeline, according to at least one embodiment. In at least one embodiment, process 900 may be deployed to perform game name recognition analysis and inferencing on user feedback data at one or more facilities 902, such as a data center.

In at least one embodiment, process 900 may be executed within a training system 904 and/or a deployment system 906. In at least one embodiment, training system 904 may be used to perform training, deployment, and embodiment of machine learning models (e.g., neural networks, object detection algorithms, computer vision algorithms, etc.) for use in deployment system 906. In at least one embodiment, deployment system 906 may be configured to offload processing and compute resources among a distributed computing environment to reduce infrastructure requirements at facility 902. In at least one embodiment, deployment system 906 may provide a streamlined platform for selecting, customizing, and implementing virtual instruments for use with computing devices at facility 902. In at least one embodiment, virtual instruments may include software-defined applications for performing one or more processing operations with respect to feedback data. In at least one embodiment, one or more applications in a pipeline may use or call upon services (e.g., inference, visualization, compute, AI, etc.) of deployment system 906 during execution of applications.

In at least one embodiment, some applications used in advanced processing and inferencing pipelines may use machine learning models or other AI to perform one or more processing steps. In at least one embodiment, machine learning models may be trained at facility 902 using feedback data 908 (such as imaging data) stored at facility 902 or feedback data 908 from another facility or facilities, or a combination thereof. In at least one embodiment, training system 904 may be used to provide applications, services, and/or other resources for generating working, deployable machine learning models for deployment system 906.

In at least one embodiment, a model registry 924 may be backed by object storage that may support versioning and object metadata. In at least one embodiment, object storage may be accessible through, for example, a cloud storage (e.g., a cloud 1026 of FIG. 10) compatible application programming interface (API) from within a cloud platform. In at least one embodiment, machine learning models within model registry 924 may be uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, a training pipeline 1004 (FIG. 10) may include a scenario where facility 902 is training their own machine learning model, or has an existing machine learning model that needs to be optimized or updated. In at least one embodiment, feedback data 908 may be received from various channels, such as forums, web forms, or the like. In at least one embodiment, once feedback data 908 is received, AI-assisted annotation 910 may be used to aid in generating annotations corresponding to feedback data 908 to be used as ground truth data for a machine learning model. In at least one embodiment, AI-assisted annotation 910 may include one or more machine learning models (e.g., convolutional neural networks (CNNs)) that may be trained to generate annotations corresponding to certain types of feedback data 908 (e.g., from certain devices) and/or certain types of anomalies in feedback data 908. In at least one embodiment, AI-assisted annotations 910 may then be used directly, or may be adjusted or fine-tuned using an annotation tool, to generate ground truth data. In at least one embodiment, in some examples, labeled data 912 may be used as ground truth data for training a machine learning model. In at least one embodiment, AI-assisted annotations 910, labeled data 912, or a combination thereof may be used as ground truth data for training a machine learning model, e.g., via model training 914 in FIGS. 9-10. In at least one embodiment, a trained machine learning model may be referred to as an output model 916, and may be used by deployment system 906, as described herein.

In at least one embodiment, training pipeline 1004 (FIG. 10) may include a scenario where facility 902 needs a machine learning model for use in performing one or more processing tasks for one or more applications in deployment system 906, but facility 902 may not currently have such a machine learning model (or may not have a model that is optimized, efficient, or effective for such purposes). In at least one embodiment, an existing machine learning model may be selected from model registry 924. In at least one embodiment, model registry 924 may include machine learning models trained to perform a variety of different inference tasks on imaging data. In at least one embodiment, machine learning models in model registry 924 may have been trained on imaging data from different facilities than facility 902 (e.g., facilities that are remotely located). In at least one embodiment, machine learning models may have been trained on imaging data from one location, two locations, or any number of locations. In at least one embodiment, when being trained on imaging data, which may be a form of feedback data 908, from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained—or partially trained—at one location, a machine learning model may be added to model registry 924. In at least one embodiment, a machine learning model may then be retrained, or updated, at any number of other facilities, and a retrained or updated model may be made available in model registry 924. In at least one embodiment, a machine learning model may then be selected from model registry 924—and referred to as output model 916—and may be used in deployment system 906 to perform one or more processing tasks for one or more applications of a deployment system.

In at least one embodiment, training pipeline 1004 (FIG. 10) may be used in a scenario that includes facility 902 requiring a machine learning model for use in performing one or more processing tasks for one or more applications in deployment system 906, but facility 902 may not currently have such a machine learning model (or may not have a model that is optimized, efficient, or effective for such purposes). In at least one embodiment, a machine learning model selected from model registry 924 might not be fine-tuned or optimized for feedback data 908 generated at facility 902 because of differences in populations, genetic variations, robustness of training data used to train a machine learning model, diversity in anomalies of training data, and/or other issues with training data. In at least one embodiment, AI-assisted annotation 910 may be used to aid in generating annotations corresponding to feedback data 908 to be used as ground truth data for retraining or updating a machine learning model. In at least one embodiment, labeled data 912 may be used as ground truth data for training a machine learning model. In at least one embodiment, retraining or updating a machine learning model may be referred to as model training 914. In at least one embodiment, model training 914—e.g., AI-assisted annotations 910, labeled data 912, or a combination thereof—may be used as ground truth data for retraining or updating a machine learning model.

In at least one embodiment, deployment system 906 may include software 918, services 920, hardware 922, and/or other components, features, and functionality. In at least one embodiment, deployment system 906 may include a software "stack," such that software 918 may be built on top of services 920 and may use services 920 to perform some or all of processing tasks, and services 920 and software 918 may be built on top of hardware 922 and use hardware 922 to execute processing, storage, and/or other compute tasks of deployment system 906.

In at least one embodiment, software 918 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of computing device there may be any number of containers that may perform a data processing task with respect to feedback data 908 (or other data types, such as those described herein). In at least one embodiment, an advanced processing and inferencing pipeline may be defined based on selections of different containers that are desired or required for processing feedback data 908, in addition to containers that receive and configure imaging data for use by each container and/or for use by facility 902 after processing through a pipeline (e.g., to convert outputs back to a usable data type for storage and display at facility 902). In at least one embodiment, a combination of containers within software 918 (e.g., that make up a pipeline) may be referred to as a virtual instrument (as described in more detail herein), and a virtual instrument may leverage services 920 and hardware 922 to execute some or all processing tasks of applications instantiated in containers.

In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 916 of training system 904.

In at least one embodiment, tasks of data processing pipeline may be encapsulated in one or more container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 924 and associated with one or more applications. In at least one embodiment, images of applications (e.g., container images) may be available in a container registry, and once selected by a user from a container registry for deployment in a pipeline, an image may be used to generate a container for an instantiation of an application for use by a user system.

In at least one embodiment, developers may develop, publish, and store applications (e.g., as containers) for performing processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 920 as a system (e.g., system 1000 of FIG. 10). In at least one embodiment, once validated by system 1000 (e.g., for accuracy, etc.), an application may be available in a container registry for selection and/or embodiment by a user (e.g., a hospital, clinic, lab, healthcare provider, etc.) to perform one or more processing tasks with respect to data at a facility (e.g., a second facility) of a user.

Figure 10:
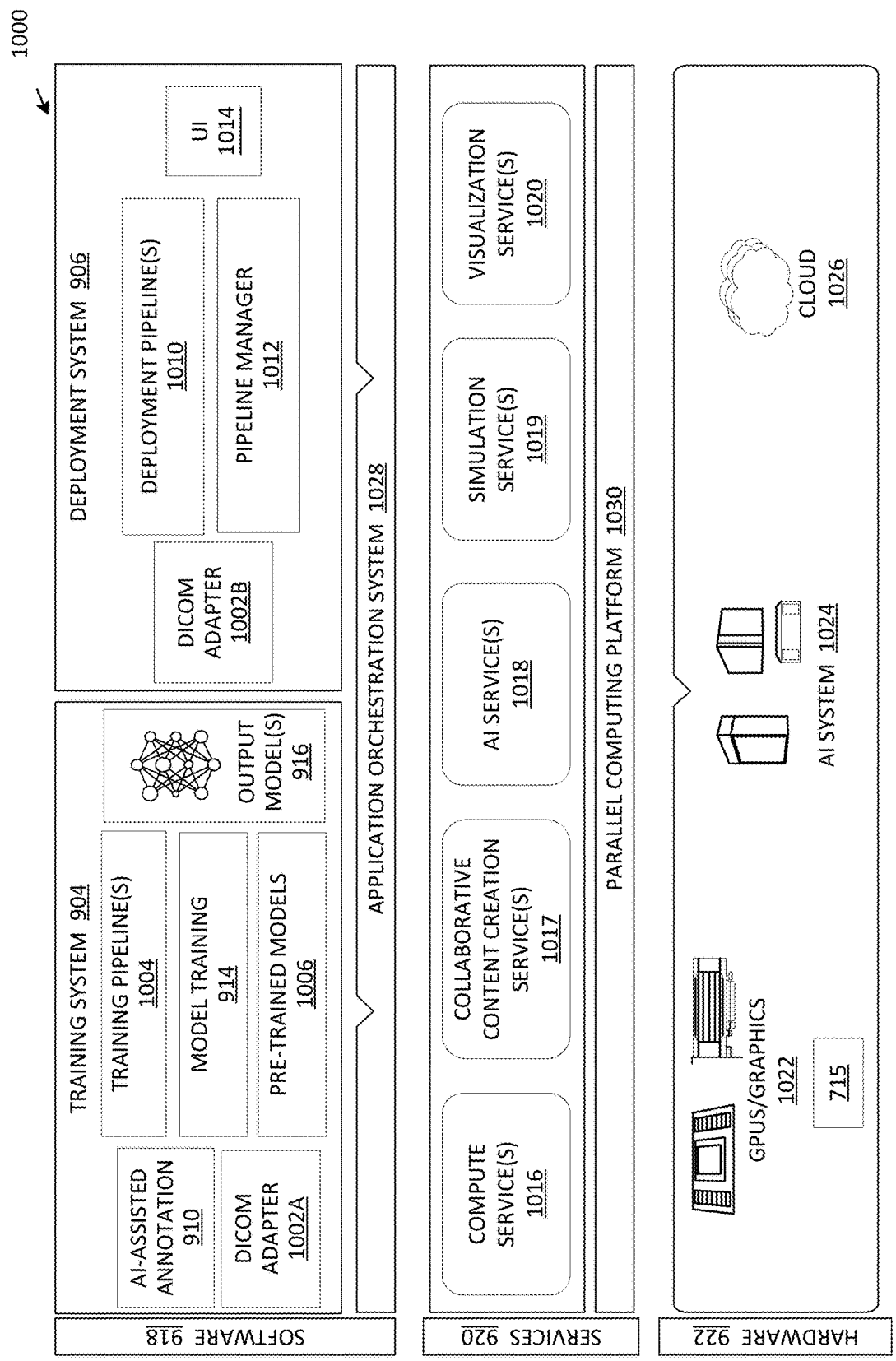
FIG. 10 is a system diagram for an example system for training, adapting, instantiating and deploying machine learning models in an advanced computing pipeline, according to at least one embodiment.

In at least one embodiment, developers may then share applications or containers through a network for access and use by users of a system (e.g., system 1000 of FIG. 10). In at least one embodiment, completed and validated applications or containers may be stored in a container registry and associated machine learning models may be stored in model registry 924. In at least one embodiment, a requesting entity that provides an inference or image processing request may browse a container registry and/or model registry 924 for an application, container, dataset, machine learning model, etc., select a desired combination of elements for inclusion in data processing pipeline, and submit a processing request. In at least one embodiment, a request may include input data that is necessary to perform a request, and/or may include a selection of application(s) and/or machine learning models to be executed in processing a request. In at least one embodiment, a request may then be passed to one or more components of deployment system 906 (e.g., a cloud) to perform processing of a data processing pipeline. In at least one embodiment, processing by deployment system 906 may include referencing selected elements (e.g., applications, containers, models, etc.) from a container registry and/or model registry 924. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 920 may be leveraged. In at least one embodiment, services 920 may include compute services, collaborative content creation services, simulation services, artificial intelligence (AI) services, visualization services, and/or other service types. In at least one embodiment, services 920 may provide functionality that is common to one or more applications in software 918, so functionality may be abstracted to a service that may be called upon or leveraged by applications. In at least one embodiment, functionality provided by services 920 may run dynamically and more efficiently, while also scaling well by allowing applications to process data in parallel, e.g., using a parallel computing platform 1030 (FIG. 10). In at least one embodiment, rather than each application that shares a same functionality offered by a service 920 being required to have a respective instance of service 920, service 920 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities.

In at least one embodiment, where a service 920 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 918 implementing advanced processing and inferencing pipeline may be streamlined because each application may call upon the same inference service to perform one or more inferencing tasks.

In at least one embodiment, hardware 922 may include GPUs, CPUs, graphics cards, an AI/deep learning system (e.g., an AI supercomputer, such as NVIDIA's DGX™ supercomputer system), a cloud platform, or a combination thereof. In at least one embodiment, different types of hardware 922 may be used to provide efficient, purpose-built support for software 918 and services 920 in deployment system 906. In at least one embodiment, use of GPU processing may be implemented for processing locally (e.g., at facility 902), within an AI/deep learning system, in a cloud system, and/or in other processing components of deployment system 906 to improve efficiency, accuracy, and efficacy of game name recognition.

In at least one embodiment, software 918 and/or services 920 may be optimized for GPU processing with respect to deep learning, machine learning, and/or high-performance computing, simulation, and visual computing, as non-limiting examples. In at least one embodiment, at least some of the computing environment of deployment system 906 and/or training system 904 may be executed in a datacenter or one or more supercomputers or high performance computing systems, with GPU-optimized software (e.g., hardware and software combination of NVIDIA's DGX™ system). In at least one embodiment, hardware 922 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC™) may be executed using an AI/deep learning supercomputer(s) and/or GPU-optimized software (e.g., as provided on NVIDIA's DGX™ systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 10 is a system diagram for an example system 1000 for generating and deploying a deployment pipeline, according to at least one embodiment. In at least one embodiment, system 1000 may be used to implement process 900 of FIG. 9 and/or other processes including advanced processing and inferencing pipelines. In at least one embodiment, system 1000 may include training system 904 and deployment system 906. In at least one embodiment, training system 904 and deployment system 906 may be implemented using software 918, services 920, and/or hardware 922, as described herein.

In at least one embodiment, system 1000 (e.g., training system 904 and/or deployment system 906) may implemented in a cloud computing environment (e.g., using cloud 1026). In at least one embodiment, system 1000 may be implemented locally with respect to a facility, or as a combination of both cloud and local computing resources. In at least one embodiment, access to APIs in cloud 1026 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1000, may be restricted to a set of public internet service providers (ISPs) that have been vetted or authorized for interaction.

In at least one embodiment, various components of system 1000 may communicate between and among one another using any of a variety of different network types, including but not limited to local area networks (LANs) and/or wide area networks (WANs) via wired and/or wireless communication protocols. In at least one embodiment, communication between facilities and components of system 1000 (e.g., for transmitting inference requests, for receiving results of inference requests, etc.) may be communicated over a data bus or data busses, wireless data protocols (Wi-Fi), wired data protocols (e.g., Ethernet), etc.

In at least one embodiment, training system 904 may execute training pipelines 1004, similar to those described herein with respect to FIG. 9. In at least one embodiment, where one or more machine learning models are to be used in deployment pipelines 1010 by deployment system 906, training pipelines 1004 may be used to train or retrain one or more (e.g., pre-trained) models, and/or implement one or more of pre-trained models 1006 (e.g., without a need for retraining or updating). In at least one embodiment, as a result of training pipelines 1004, output model(s) 916 may be generated. In at least one embodiment, training pipelines 1004 may include any number of processing steps, AI-assisted annotation 910, labeling or annotating of feedback data 908 to generate labeled data 912, model selection from a model registry, model training 914, training, retraining, or updating models, and/or other processing steps. In at least one embodiment, for different machine learning models used by deployment system 906, different training pipelines 1004 may be used. In at least one embodiment, training pipeline 1004, similar to a first example described with respect to FIG. 9, may be used for a first machine learning model, training pipeline 1004, similar to a second example described with respect to FIG. 9, may be used for a second machine learning model, and training pipeline 1004, similar to a third example described with respect to FIG. 9, may be used for a third machine learning model. In at least one embodiment, any combination of tasks within training system 904 may be used depending on what is required for each respective machine learning model. In at least one embodiment, one or more of machine learning models may already be trained and ready for deployment so machine learning models may not undergo any processing by training system 904, and may be implemented by deployment system 906.

In at least one embodiment, output model(s) 916 and/or pre-trained model(s) 1006 may include any types of machine learning models depending on embodiment. In at least one embodiment, and without limitation, machine learning models used by system 1000 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Bi-LSTM, Hopfield, Boltzmann, deep belief, deconvolutional, generative adversarial, liquid state machine, etc.), and/or other types of machine learning models.

In at least one embodiment, training pipelines 1004 may include AI-assisted annotation. In at least one embodiment, labeled data 912 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of feedback data 908 (or other data type used by machine learning models), there may be corresponding ground truth data generated by training system 904. In at least one embodiment, AI-assisted annotation may be performed as part of deployment pipelines 1010; either in addition to, or in lieu of, AI-assisted annotation included in training pipelines 1004. In at least one embodiment, system 1000 may include a multi-layer platform that may include a software layer (e.g., software 918) of diagnostic applications (or other application types) that may perform one or more medical imaging and diagnostic functions.

In at least one embodiment, a software layer may be implemented as a secure, encrypted, and/or authenticated API through which applications or containers may be invoked (e.g., called) from an external environment(s), e.g., facility 902. In at least one embodiment, applications may then call or execute one or more services 920 for performing compute, AI, or visualization tasks associated with respective applications, and software 918 and/or services 920 may leverage hardware 922 to perform processing tasks in an effective and efficient manner.

In at least one embodiment, deployment system 906 may execute deployment pipelines 1010. In at least one embodiment, deployment pipelines 1010 may include any number of applications that may be sequentially, non-sequentially, or otherwise applied to feedback data (and/or other data types), including AI-assisted annotation, as described above. In at least one embodiment, as described herein, a deployment pipeline 1010 for an individual device may be referred to as a virtual instrument for a device. In at least one embodiment, for a single device, there may be more than one deployment pipeline 1010 depending on information desired from data generated by a device.

In at least one embodiment, applications available for deployment pipelines 1010 may include any application that may be used for performing processing tasks on feedback data or other data from devices. In at least one embodiment, because various applications may share common image operations, in some embodiments, a data augmentation library (e.g., as one of services 920) may be used to accelerate these operations. In at least one embodiment, to avoid bottlenecks of conventional processing approaches that rely on CPU processing, parallel computing platform 1030 may be used for GPU acceleration of these processing tasks.

In at least one embodiment, deployment system 906 may include a user interface (UI) 1014 (e.g., a graphical user interface, a web interface, etc.) that may be used to select applications for inclusion in deployment pipeline(s) 1010, arrange applications, modify or change applications or parameters or constructs thereof, use and intera with deployment pipeline(s) 1010 during set-up and/or deployment, and/or to otherwise interact with deployment system 906. In at least one embodiment, although not illustrated with respect to training system 904, UI 1014 (or a different user interface) may be used for selecting models for use in deployment system 906, for selecting models for training, or retraining, in training system 904, and/or for otherwise interacting with training system 904.

In at least one embodiment, pipeline manager 1012 may be used, in addition to an application orchestration system 1028, to manage interaction between applications or containers of deployment pipeline(s) 1010 and services 920 and/or hardware 922. In at least one embodiment, pipeline manager 1012 may be configured to facilitate interactions from application to application, from application to service 920, and/or from application or service to hardware 922. In at least one embodiment, although illustrated as included in software 918, this is not intended to be limiting, and in some examples pipeline manager 1012 may be included in services 920. In at least one embodiment, application orchestration system 1028 (e.g., Kubernetes, DOCKER, etc.) may include a container orchestration system that may group applications into containers as logical units for coordination, management, scaling, and deployment. In at least one embodiment, by associating applications from deployment pipeline(s) 1010 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of other application(s) or container(s). In at least one embodiment, communication, and cooperation between different containers or applications may be aided by pipeline manager 1012 and application orchestration system 1028. In at least one embodiment, so long as an expected input and/or output of each container or application is known by a system (e.g., based on constructs of applications or containers), application orchestration system 1028 and/or pipeline manager 1012 may facilitate communication among and between, and sharing of resources among and between, each of applications or containers. In at least one embodiment, because one or more of applications or containers in deployment pipeline(s) 1010 may share the same services and resources, application orchestration system 1028 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, the scheduler may thus allocate resources to different applications and distribute resources between and among applications in view of requirements and availability of a system. In some examples, the scheduler (and/or other component of application orchestration system 1028) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 920 leveraged and shared by applications or containers in deployment system 906 may include compute services 1016, collaborative content creation services 1017, AI services 1018, simulation services 1019, visualization services 1020, and/or other service types. In at least one embodiment, applications may call (e.g., execute) one or more of services 920 to perform processing operations for an application. In at least one embodiment, compute services 1016 may be leveraged by applications to perform super-computing or other high-performance computing (HPC) tasks. In at least one embodiment, compute service(s) 1016 may be leveraged to perform parallel processing (e.g., using a parallel computing platform 1030) for processing data through one or more of applications and/or one or more tasks of a single application, substantially simultaneously. In at least one embodiment, parallel computing platform 1030 (e.g., NVIDIA's CUDAR) may enable general purpose computing on GPUs (GPGPU) (e.g., GPUs 1022). In at least one embodiment, a software layer of parallel computing platform 1030 may provide access to virtual instruction sets and parallel computational elements of GPUs, for execution of compute kernels. In at least one embodiment, parallel computing platform 1030 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1030 (e.g., where multiple different stages of an application or multiple applications are processing same information). In at least one embodiment, rather than making a copy of data and moving data to different locations in memory (e.g., a read/write operation), same data in the same location of a memory may be used for any number of processing tasks (e.g., at the same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1018 may be leveraged to perform inferencing services for executing machine learning model(s) associated with applications (e.g., tasked with performing one or more processing tasks of an application). In at least one embodiment, AI services 1018 may leverage AI system 1024 to execute machine learning model(s) (e.g., neural networks, such as CNNs) for segmentation, reconstruction, object detection, feature detection, classification, and/or other inferencing tasks. In at least one embodiment, applications of deployment pipeline(s) 1010 may use one or more of output models 916 from training system 904 and/or other models of applications to perform inference on imaging data (e.g., DICOM data, RIS data, CIS data, REST compliant data, RPC data, raw data, etc.). In at least one embodiment, two or more examples of inferencing using application orchestration system 1028 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1028 may distribute resources (e.g., services 920 and/or hardware 922) based on priority paths for different inferencing tasks of AI services 1018.

In at least one embodiment, shared storage may be mounted to AI services 1018 within system 1000. In at least one embodiment, shared storage may operate as a cache (or other storage device type) and may be used to process inference requests from applications. In at least one embodiment, when an inference request is submitted, a request may be received by a set of API instances of deployment system 906, and one or more instances may be selected (e.g., for best fit, for load balancing, etc.) to process a request. In at least one embodiment, to process a request, a request may be entered into a database, a machine learning model may be located from model registry 924 if not already in a cache, a validation step may ensure appropriate machine learning model is loaded into a cache (e.g., shared storage), and/or a copy of a model may be saved to a cache. In at least one embodiment, the scheduler (e.g., of pipeline manager 1012) may be used to launch an application that is referenced in a request if an application is not already running or if there are not enough instances of an application. In at least one embodiment, if an inference server is not already launched to execute a model, an inference server may be launched. In at least one embodiment, any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as the inference server is running as a different instance.

In at least one embodiment, during application execution, an inference request for a given application may be received, and a container (e.g., hosting an instance of an inference server) may be loaded (if not already loaded), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (turnaround time less than one minute) priority while others may have lower priority (e.g., turnaround less than 10 minutes). In at least one embodiment, model execution times may be measured from requesting institution or entity and may include partner network traversal time, as well as execution on an inference service.

In at least one embodiment, transfer of requests between services 920 and inference applications may be hidden behind a software development kit (SDK), and robust transport may be provided through a queue. In at least one embodiment, a request is placed in a queue via an API for an individual application/tenant ID combination and an SDK pulls a request from a queue and gives a request to an application. In at least one embodiment, a name of a queue may be provided in an environment from where an SDK picks up the request. In at least one embodiment, asynchronous communication through a queue may be useful as it may allow any instance of an application to pick up work as it becomes available. In at least one embodiment, results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1026, and an inference service may perform inferencing on a GPU.

In at least one embodiment, visualization services 1020 may be leveraged to generate visualizations for viewing outputs of applications and/or deployment pipeline(s) 1010. In at least one embodiment, GPUs 1022 may be leveraged by visualization services 1020 to generate visualizations. In at least one embodiment, rendering effects, such as ray-tracing or other light transport simulation techniques, may be implemented by visualization services 1020 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1020 may include an internal visualizer, cinematics, and/or other rendering or image processing capabilities or functionality (e.g., ray tracing, rasterization, internal optics, etc.).

In at least one embodiment, hardware 922 may include GPUs 1022, AI system 1024, cloud 1026, and/or any other hardware used for executing training system 904 and/or deployment system 906. In at least one embodiment, GPUs 1022 (e.g., NVIDIA's TESLA R and/or QUADRO® GPUs) may include any number of GPUs that may be used for executing processing tasks of compute services 1016, collaborative content creation services 1017, AI services 1018, simulation services 1019, visualization services 1020, other services, and/or any of features or functionality of software 918. For example, with respect to AI services 1018, GPUs 1022 may be used to perform pre-processing on imaging data (or other data types used by machine learning models), post-processing on outputs of machine learning models, and/or to perform inferencing (e.g., to execute machine learning models). In at least one embodiment, cloud 1026, AI system 1024, and/or other components of system 1000 may use GPUs 1022. In at least one embodiment, cloud 1026 may include a GPU-optimized platform for deep learning tasks. In at least one embodiment, AI system 1024 may use GPUs, and cloud 1026—or at least a portion tasked with deep learning or inferencing—may be executed using one or more AI systems 1024. As such, although hardware 922 is illustrated as discrete components, this is not intended to be limiting, and any components of hardware 922 may be combined with, or leveraged by, any other components of hardware 922.

In at least one embodiment, AI system 1024 may include a purpose-built computing system (e.g., a super-computer or an HPC) configured for inferencing, deep learning, machine learning, and/or other artificial intelligence tasks. In at least one embodiment, AI system 1024 (e.g., NVIDIA's DGX™) may include GPU-optimized software (e.g., a software stack) that may be executed using a plurality of GPUs 1022, in addition to CPUs, RAM, storage, and/or other components, features, or functionality. In at least one embodiment, one or more AI systems 1024 may be implemented in cloud 1026 (e.g., in a data center) for performing some or all of AI-based processing tasks of system 1000.

In at least one embodiment, cloud 1026 may include a GPU-accelerated infrastructure (e.g., NVIDIA's NGC™) that may provide a GPU-optimized platform for executing processing tasks of system 1000. In at least one embodiment, cloud 1026 may include an AI system(s) 1024 for performing one or more of AI-based tasks of system 1000 (e.g., as a hardware abstraction and scaling platform). In at least one embodiment, cloud 1026 may integrate with application orchestration system 1028 leveraging multiple GPUs to enable seamless scaling and load balancing between and among applications and services 920. In at least one embodiment, cloud 1026 may be tasked with executing at least some of services 920 of system 1000, including compute services 1016, AI services 1018, and/or visualization services 1020, as described herein. In at least one embodiment, cloud 1026 may perform small and large batch inference (e.g., executing NVIDIA's TensorRT™), provide an accelerated parallel computing API and platform 1030 (e.g., NVIDIA's CUDA®), execute application orchestration system 1028 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1000.

In at least one embodiment, in an effort to preserve patient confidentiality (e.g., where patient data or records are to be used off-premises), cloud 1026 may include a registry, such as a deep learning container registry. In at least one embodiment, a registry may store containers for instantiations of applications that may perform pre-processing, post-processing, or other processing tasks on patient data. In at least one embodiment, cloud 1026 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus.

Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computing device comprising one or more processing units, the computing device to:
   receive a signal representative of at least one of:
      a time-dependent processing load of the one or more processing units executing a computing application, or
      a time-dependent memory utilization of one or more memory units communicatively coupled to the one or more processing units;
   process the signal to generate one or more units of runtime activity data (RAD), an individual unit of RAD comprising one or more statistical characteristics of the signal associated with a respective temporal interval of one or more temporal intervals of the signal;
   process, using a machine learning model (MLM), an input comprising the one or more units of RAD to generate settings for the one or more processing units, wherein the settings comprise at least one of:
      an operating frequency setting for at least one processing unit of the one or more processing units, or
      a voltage setting for the at least one processing unit of the one or more processing units; and
   modify, using the generated settings, the execution of the computing application on the one or more processing units.

2. The computing device of claim 1, wherein the one or more processing units comprise at least one of:
   a graphics processing unit,
   a central processing unit,
   a data processing unit, or
   a hardware accelerator.

3. The computing device of claim 1, wherein the one or more statistical characteristics of the signal comprise a number of times the signal departs from a predetermined range during the respective temporal interval.

4. The computing device of claim 1, wherein the one or more statistical characteristics of the signal comprise at least one of:
   an average value associated with the signal,
   a standard deviation associated with the signal, or
   a set of statistics associated with the signal relative to a target range.

5. The computing device of claim 1, wherein the generated settings comprise the operating frequency setting and the voltage setting for the at least one processing units.

6. The computing device of claim 1, wherein the computing application comprises at least one of:

a video encoding application,
a video decoding application,
an image processing application,
a synthetic data generation application, or
a machine learning application.

7. The computing device of claim 1, wherein the computing device is further to:
select one or more parameters of the MLM responsive to a mode selection instruction, wherein the mode selection instruction selects a mode of the MLM from a plurality of modes associated with different target power-performance metrics for the one or more processing units.

8. The computing device of claim 1, wherein the MLM is trained using one or more reinforcement learning techniques.

9. The computing device of claim 1, wherein the computing device is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system for generating or presenting at least one of augmented reality content, virtual reality content, or mixed reality content;
a system implemented using a robot;
a system for performing conversational AI operations;
a system for generating synthetic data;
a system incorporating one or more language models;
a system incorporating one or more virtual machines (VMs);
a system implemented at least partially in a data center; or
a system implemented at least partially using cloud computing resources.

10. A method comprising:
receiving a signal representative of at least one of:
a time-dependent processing load of one or more processing units executing a computing application, or
a time-dependent memory utilization of one or more memory units communicatively coupled to the one or more processing units;
processing the signal to generate one or more units of runtime activity data (RAD), an individual unit of RAD comprising one or more statistical characteristics of the signal associated with a respective temporal interval of one or more temporal intervals of the signal;
processing, using a machine learning model (MLM), an input comprising the one or more units of RAD to generate settings for the one or more processing units, wherein the settings comprise at least one of:
an operating frequency setting for at least one processing unit of the one or more processing units, or
a voltage setting for the at least one processing unit of the one or more processing units; and
modifying, using the generated settings, the execution of the computing application on the one or more processing units.

11. The method of claim 10, wherein the one or more processing units comprise at least one of:
a graphics processing unit,
a central processing unit,
a data processing unit, or
a hardware accelerator.

12. The method of claim 10, wherein the one or more statistical characteristics of the signal comprise at least one of:
an average value associated with the signal,
a standard deviation associated with the signal, or a set of statistics associated with the signal relative to a target range.

13. The method of claim 10, wherein the generated settings comprise the operating frequency setting and the voltage setting for the at least one of the one or more processing units.

14. The method of claim 10, further comprising:
selecting one or more parameters of the MLM responsive to a mode selection instruction, wherein the mode selection instruction selects a mode of the MLM from a plurality of modes associated with different target power-performance metrics for the one or more processing units.

15. A method comprising:
obtaining a first training activity data that characterizes runtime execution, at a first time, of a computing application using one or more processing units configured using one or more initial settings;
processing, using a machine learning model (MLM), the first training activity data to generate one or more updated settings for the one or more processing units;
obtaining a second training activity data that characterizes runtime execution, at a second time, of the computing application on the one or more processing units configured using the one or more updated settings;
processing, using a reward function, the second training activity data to obtain a reward value characterizing performance of the one or more processing units configured using the one or more updated settings, wherein the reward function comprises a power economy metric, weighted using a first weight, and one or more performance metrics, weighted using respective one or more second weights;
modifying, using the reward value, one or more parameters of the MLM; and
deploying, using the one or more processing units, the MLM to optimize performance of the computing application.

16. The method of claim 15, wherein the one or more processing units comprise at least one of:
a graphics processing unit,
a central processing unit,
a data processing unit, or
a hardware accelerator.

17. The method of claim 15, wherein the first training activity data comprises one or more of:
a runtime processing load of the one or more processing units at a first time, or
a runtime memory utilization by the one or more processing units, at the first time.

18. The method of claim 17, wherein the runtime processing load comprises at least one of:
an average runtime processing load over a sliding window,
a standard deviation of the runtime processing load from the runtime processing load, or a statistics of the runtime processing load departures from a target range of processing loads.

19. The method of claim 15, wherein the one or more updated settings comprise an operating frequency of at least one of the one or more processing units.

* * * * *